(12) United States Patent
Ivashin et al.

(10) Patent No.: US 8,189,030 B2
(45) Date of Patent: May 29, 2012

(54) PERMISSION-BASED CONTENT FILTERING FOR VIDEO RECORDINGS

(75) Inventors: Victor Ivashin, Danville, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 937 days.

(21) Appl. No.: 12/204,519

(22) Filed: Sep. 4, 2008

(65) Prior Publication Data

US 2010/0053302 A1    Mar. 4, 2010

(51) Int. Cl.
*H04N 7/15* (2006.01)
(52) U.S. Cl. ............... 348/14.08; 348/14.01; 348/211.12
(58) Field of Classification Search ............... 348/14.01, 348/14.08, 211.12, 239, 575; 379/93.21, 379/158, 202.01, 205.01
See application file for complete search history.

(56) References Cited

U.S. PATENT DOCUMENTS

| 5,717,879 | A | 2/1998 | Moran et al. |
| 6,954,894 | B1 | 10/2005 | Balnaves et al. |
| 7,213,051 | B2 | 5/2007 | Zhu et al. |
| 7,287,053 | B2* | 10/2007 | Bodin ........................... 709/204 |
| 7,428,000 | B2* | 9/2008 | Cutler et al. ............... 348/14.11 |
| 2007/0112926 | A1 | 5/2007 | Brett et al. |

* cited by examiner

*Primary Examiner* — Curtis Kuntz
*Assistant Examiner* — Yosef K Laekemariam

(57) ABSTRACT

Computer-readable media having corresponding apparatus and methods embodies instructions executable by a computer to perform a method comprising: receiving a request to stream a video recording; selecting one of a plurality of user types based on the request; selecting one of a plurality of content filters for the video recording based on the selected user type, wherein at least one of the content filters identifies one or more portions of the video recording to be omitted; and streaming the video recording, except for the one or more portions of the video recording to be omitted.

20 Claims, 13 Drawing Sheets

PERMISSION-BASED CONTENT FILTERING FOR VIDEO RECORDINGS

BACKGROUND

The present disclosure relates generally to video recordings. More particularly, the present disclosure relates to permission-based content filtering for streaming video recordings.

Attendance by all parties to a conference is not always practical due to logistical or scheduling reasons. Sometimes participants arrive late or leave early. It is also not guaranteed that participants are free from interruptions during a conference. At other times, some or all conference content may be identified as being beneficial to a wider target audience than those that attended the videoconference. In all cases, important presentation content may be missed by the necessary members. It is therefore becoming more commonplace to record videoconferences and events for the purpose of historical reference, review, training, security, and the like. Communication can thus continue after a videoconference and its participants have been dismissed.

Recording provides someone who missed a videoconference, or portion thereof, a way to "catch-up" with the content exchanged. Recorded content can offer witness to an event or clarification for one's memory of same. Recordings also provide others access to this information that otherwise would be lost. Recordings are also helpful for providing direct access to videoconference documents and other information exchanged without the need to burden attendees with maintaining often incomplete papers or notes.

SUMMARY

In general, in one aspect, an embodiment features computer-readable media embodying instructions executable by a computer to perform a method comprising: receiving a request to stream a video recording; selecting one of a plurality of user types based on the request; selecting one of a plurality of content filters for the video recording based on the selected user type, wherein at least one of the content filters identifies one or more portions of the video recording to be omitted; and streaming the video recording, except for the one or more portions of the video recording to be omitted.

Embodiments of the computer-readable media can include one or more of the following features. In some embodiments, the video recording comprises: a recording of a videoconference. In some embodiments, the request includes a password; and selecting the one of the plurality of user types based on the request comprises selecting the one of the plurality of user types based on the password. In some embodiments, streaming the video recording, except for the one or more portions of the video recording to be omitted, comprises: replacing, with null data, the one or more portions of the video recording to be omitted. In some embodiments, the method further comprises: transmitting the selected content filter; wherein a playback application uses the selected content filter to skip the one or more portions of the video recording to be omitted.

In general, in one aspect, an embodiment features an apparatus comprising: a user interface module adapted to receive a request to stream a video recording; an access controller adapted to select one of a plurality of user types based on the request, and adapted to select one of a plurality of content filters for the video recording based on the selected user type, wherein at least one of the content filters identifies one or more portions of the video recording to be omitted; and a stream processor adapted to stream the video recording, except for the one or more portions of the video recording to be omitted.

Embodiments of the apparatus can include one or more of the following features. In some embodiments, the video recording comprises: a recording of a videoconference. In some embodiments, the request includes a password; and wherein the access controller selects the one of the plurality of user types based on the password. In some embodiments, the stream processor replaces, with null data, the one or more portions of the video recording to be omitted. In some embodiments, the access controller transmits the selected content filter; and a playback application uses the selected content filter to skip the one or more portions of the video recording to be omitted.

In general, in one aspect, an embodiment features an apparatus comprising: user interface means for receiving a request to stream a video recording; access control means for selecting one of a plurality of user types based on the request, and for selecting one of a plurality of content filters for the video recording based on the selected user type, wherein at least one of the content filters identifies one or more portions of the video recording to be omitted; and stream processor means for streaming the video recording, except for the one or more portions of the video recording to be omitted.

In some embodiments, the video recording comprises: a recording of a videoconference. In some embodiments, the request includes a password; and the access control means selects the one of the plurality of user types based on the password. In some embodiments, the stream processor means replaces, with null data, the one or more portions of the video recording to be omitted. In some embodiments, the access control means transmits the selected content filter; and wherein a playback application uses the selected content filter to skip the one or more portions of the video recording to be omitted.

In general, in one aspect, an embodiment features a method comprising: receiving a request to stream a video recording; selecting one of a plurality of user types based on the request; selecting one of a plurality of content filters for the video recording based on the selected user type, wherein at least one of the content filters identifies one or more portions of the video recording to be omitted; and streaming the video recording, except for the one or more portions of the video recording to be omitted.

Embodiments of the method can include one or more of the following features. In some embodiments, the video recording comprises: a recording of a videoconference. In some embodiments, the request includes a password; and selecting the one of the plurality of user types based on the request comprises selecting the one of the plurality of user types based on the password. In some embodiments, streaming the video recording, except for the one or more portions of the video recording to be omitted, comprises: replacing, with null data, the one or more portions of the video recording to be omitted. In some embodiments, the method further comprises: transmitting the selected content filter; wherein a playback application uses the selected content filter to skip the one or more portions of the video recording to be omitted.

The details of one or more implementations are set forth in the accompanying drawings and the description below. Other features will be apparent from the description and drawings, and from the claims.

Figure 1:
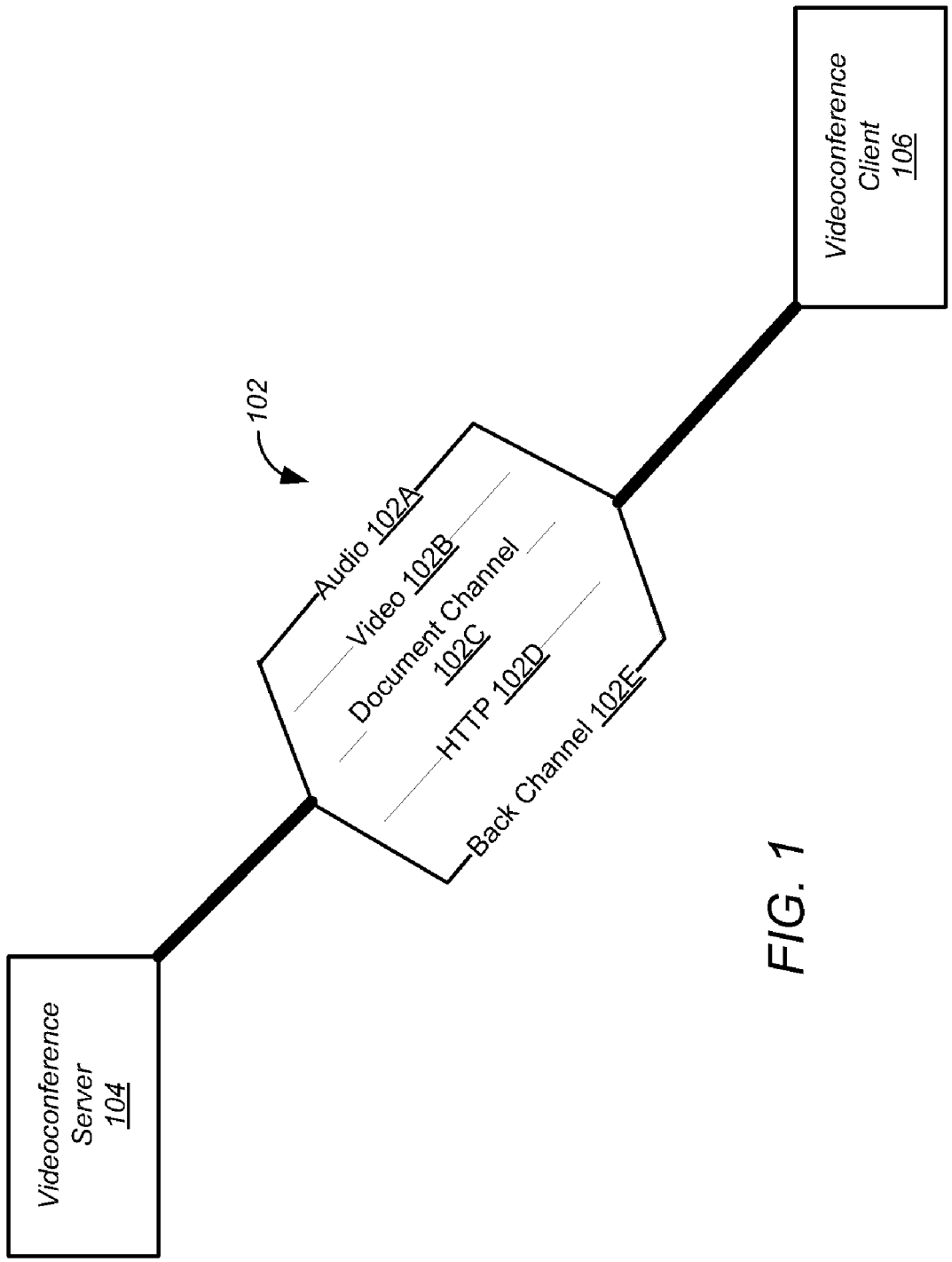
FIG. 1 shows the logical connections between a videoconference client and a videoconference server according to one embodiment.

The leading digit(s) of each reference numeral used in this specification indicates the number of the drawing in which the reference numeral first appears.

DETAILED DESCRIPTION

Various embodiments provide permission-based content filtering for streaming video recordings. As used herein, the terms "video" and "video recording" are used to refer to data that represents video, and that can additionally represent audio associated with the video. Preferably, the video recordings are not modified. Instead, content filters are created for each video recording. Each content filter includes markers that are used to filter playback of the video recordings.

The video recordings can include recordings of videoconferences and the like. However, while various embodiments are described herein with reference to videoconference recordings, these embodiments are equally applicable to other sorts of video recordings, as will be apparent to one skilled in the relevant arts based on the disclosure and teachings provided herein.

A videoconference recording 304 includes a video recording, and can include other sorts of content, such as documents, slide presentations, whiteboard activities, annotations, desktop sharing data, interactions with the conferencing system, and the like. The term "videoconference recording" refers to a recording of a videoconference that includes a video recording, and that can also include other recorded streams, files, and the like. The content filtering can apply to these types of content as well.

According to one embodiment, a server receives a request to stream a video recording. The server selects one of a plurality of user types based on the request, and selects one of a plurality of content filters for the video recording based on the selected user type. At least one of the content filters identifies one or more portions of the video recording to be omitted. The server then streams the video recording, except for the portions of the video recording to be omitted.

The server can select the user type based on the identity of the user associated with the request. When streaming the recording, the server can replace the portions of the video recording to be omitted with null data. The server can also transmit the selected content filter so that a player can use the content filter to skip the omitted portions of the video recording.

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Described herein are techniques for restricting selected content within a recording and according to different user playback roles. These techniques affect the playback of the audio, video, application and data sharing streams, and the document media within the recording, but do not directly modify the source recording. These techniques produce alternate "views" of the source recording where the term "view" refers to a playback instance and includes audio, video, documents, events, indicators, and other media within the recording (e.g. not just the visual media).

Each user of the videoconference recording playback system is assigned a type that indicates the user's control and access rights to the videoconference recording content. For example, an editing user type has authority to edit or otherwise manipulate the playback of the recorded content for other user types. Editing users have editing control over the recording playback. Restricted users may have limited access to the recording. Unrestricted users may have access to playback of all recorded content (unrestricted viewing) but do not have permission to edit or otherwise change the view of the recording for other users.

Before editing can begin, an appropriate videoconference recording must exist. Videoconference recordings can be created by a videoconference recording server, as described below.

A videoconference client maintains a number of connections to the videoconference server during a videoconference. FIG. 1 shows the logical connections 102 between a videoconference client 106 and a videoconference server 104 according to one embodiment. Separate connections 102 are established including an audio connection 102A, a video connection 102B, a document channel connection 102C, an HTTP connection 102D, and a back channel connection 102E. The connection 102 established first is document channel connection 102C, which handles authentication, requests, videoconference events and data transfer.

Once document channel connection 102C is established and the user of videoconference client 106 is authenticated to join a videoconference, audio and video connections 102A,B are established. To support video and audio processing on videoconference server 104, back channel connection 102E is also established. Back channel connection 102E communicates video layout changes, other video events, and the like, between videoconference client 106 and videoconference server 104.

Document channel connection 102C is established as needed to support videoconference events. Videoconference events can include participant events, media events, sideband stream events, annotation events, and the like. Participant events can include events where participants join and leave the videoconference, and the like. Media events can include transferring media files to be shared within the videoconference. The media files can include documents, images, and the like such as word processing files and drawing files. Sideband stream events can include starting and ending sideband streaming sessions for sharing applications, sharing video captured by a document camera, and the like. Annotation events can include participants making annotations of a whiteboard, application image, and the like.

All non-video/audio data streams and files are handled by document channel connection 102C and HTTP connection 102D. For example, when a user adds media, such as a document or image, to the videoconference, a media add command is sent to all videoconference clients over document channel connection 102C. The body of the media add command contains a URL for the media, which is stored on videoconference server 104. In response, each videoconference client 106 establishes an HTTP connection 102D with videoconference server 104 to download the media.

Figure 2:
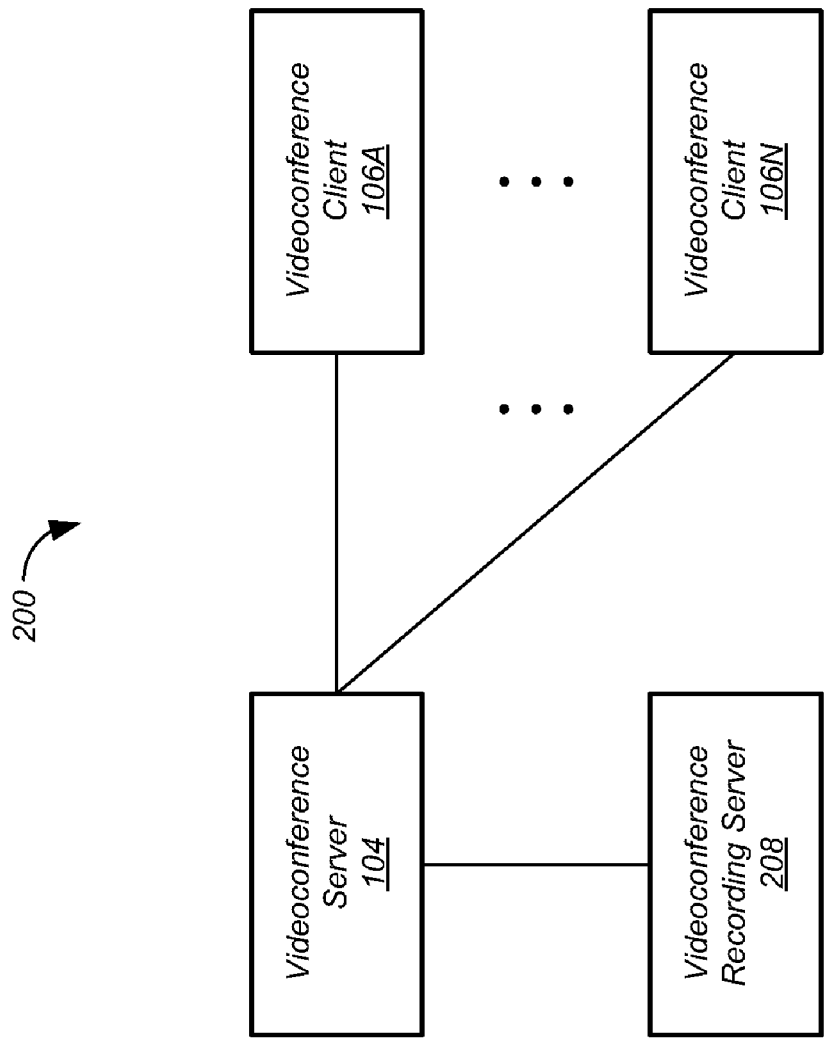
FIG. 2 shows a videoconference recording system according to one embodiment.

FIG. 2 shows a videoconference recording system 200 according to one embodiment. Although in the described embodiments, the elements of videoconference recording system 200 are presented in one arrangement, other embodiments may feature other arrangements, as will be apparent to one skilled in the relevant arts based on the disclosure and teachings provided herein.

Referring to FIG. 2, videoconference recording system 200 includes one or more videoconference clients 106A-N, a videoconference server 104, and a videoconference recording server 208. To record a videoconference, videoconference recording server 208 connects to videoconference server 104 in the same manner as a videoconference client 106, with the same logical connections 102. To videoconference server 104, videoconference recording server 208 appears the same as a videoconference client 106.

Figure 3:
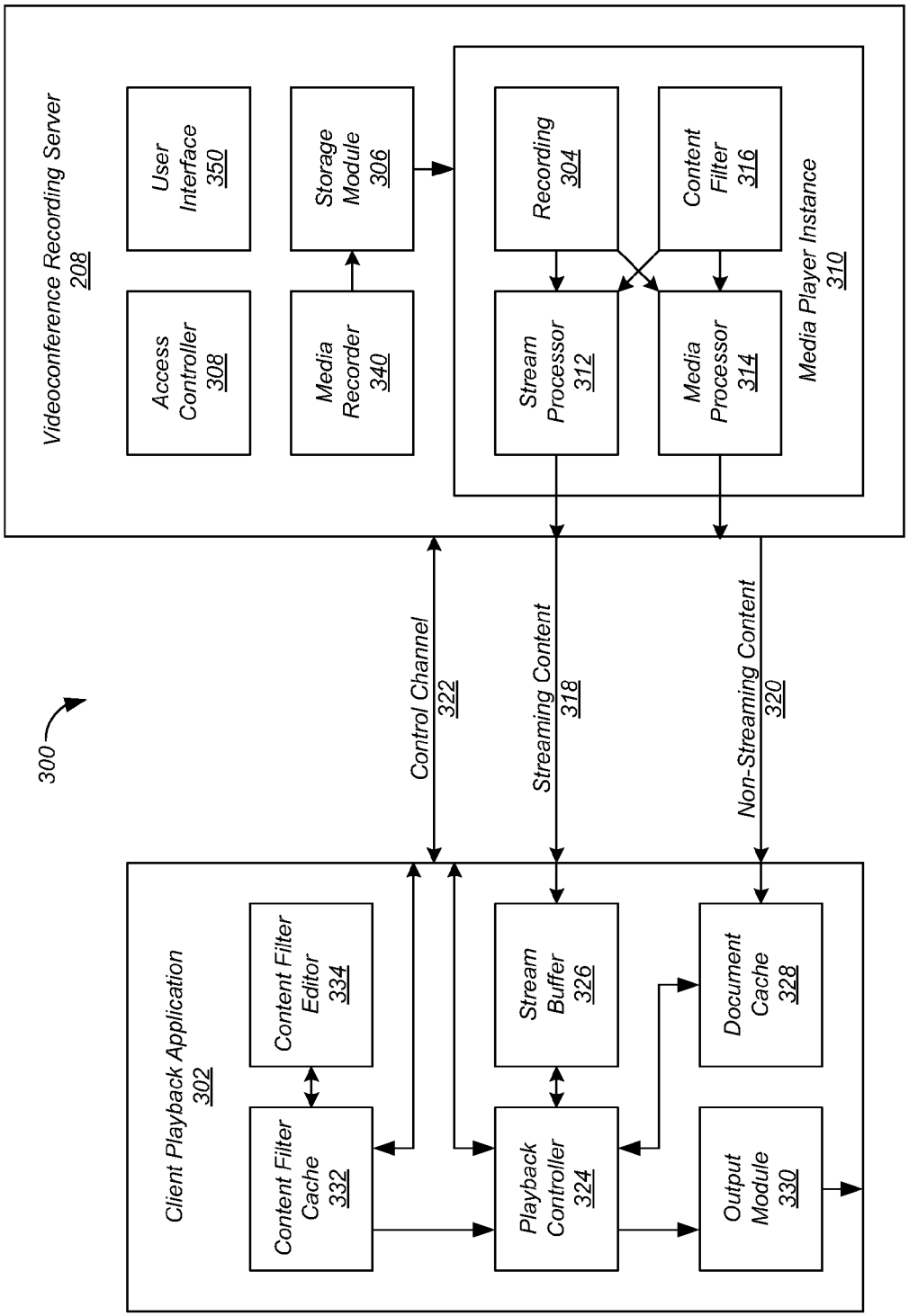
FIG. 3 shows a videoconference playback system according to one embodiment.

FIG. 3 shows a videoconference playback system 300 according to one embodiment. Although in the described embodiments, the elements of videoconference playback system 300 are presented in one arrangement, other embodiments may feature other arrangements, as will be apparent to one skilled in the relevant arts based on the disclosure and teachings provided herein.

Referring to FIG. 3, videoconference playback system 300 includes a client playback application 302 and a videoconference recording server 208. Client playback application 302 can be hosted by a videoconference client 106.

Videoconference recording server 208 includes a media recorder 340 adapted to record videoconferences and a storage module 306 adapted to store videoconference recordings 304. Videoconference recording server 208 also includes an access controller 308 adapted to restrict access to the editing functions described herein. Videoconference recording server 208 also includes a user interface 350.

To play back a videoconference recording, videoconference recording server 208 launches a media player instance 310 that includes a stream processor 312 adapted to provide streaming content 318, a media processor 314 adapted to provide non-streaming content 320, and a content filter 316. Stream processor 312 includes a null data module, described below. Media player instance 310 also establishes a control channel 322 with client playback application 302 for the exchange of playback commands and content filter editing commands.

Client playback application 302 includes a playback controller 324 adapted to provide playback of videoconference recordings to an output module 330, a stream buffer 326 adapted to buffer streaming content 318, a document cache 328 to cache non-streaming content 320, and an output module 330. Client playback application 302 also includes a content filter cache 332 to cache content filters 316 and a content filter editor 334 to edit those content filters 316.

Figure 4:
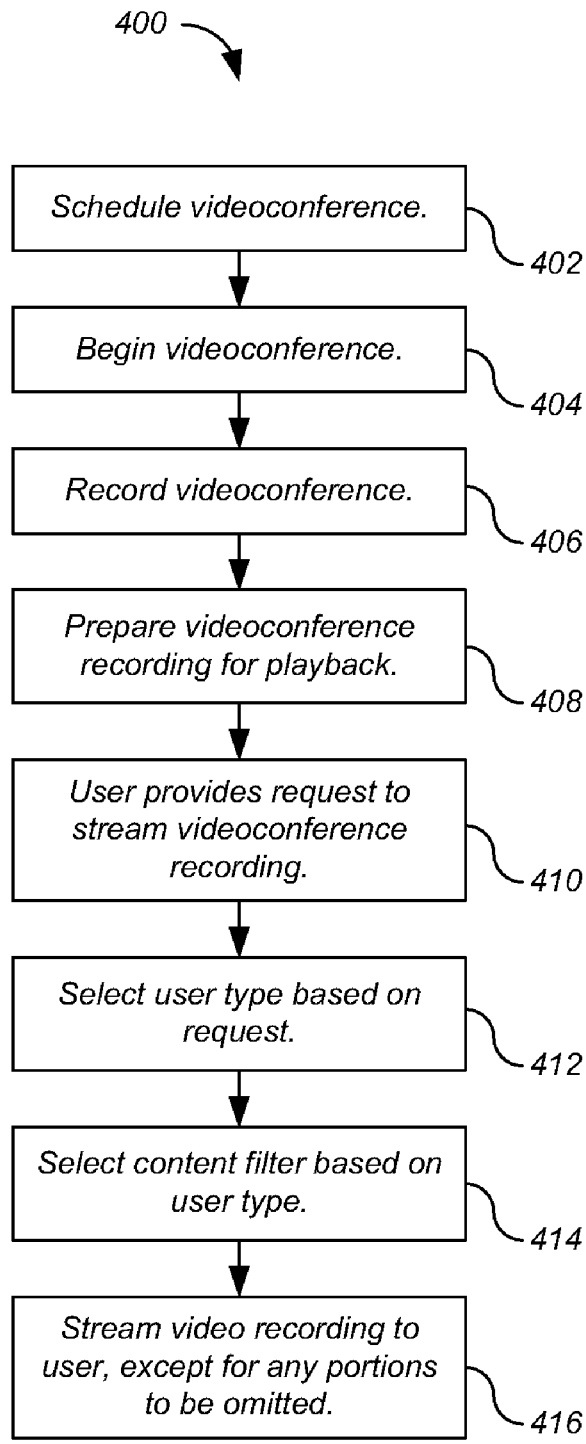
FIG. 4 shows a process for the videoconference recording system of FIG. 2 according to some embodiments.

FIG. 4 shows a process 400 for videoconference recording system 200 of FIG. 2 according to some embodiments. Although in the described embodiments, the elements of process 400 are presented in one arrangement, other embodiments may feature other arrangements, as will be apparent to one skilled in the relevant arts based on the disclosure and teachings provided herein. For example, in various embodiments, some or all of the steps of process 400 can be executed in a different order, concurrently, and the like.

Figure 5:
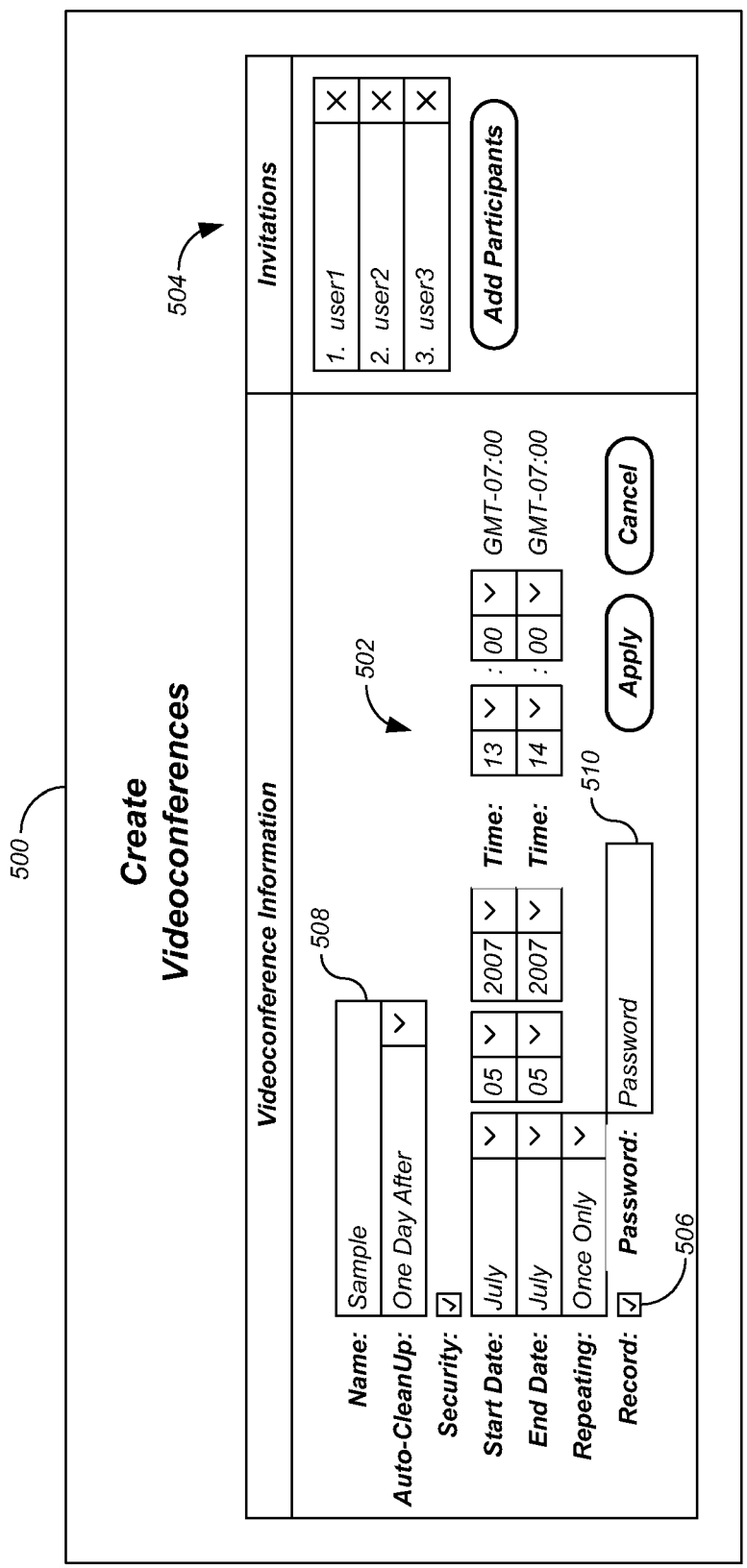
FIG. 5 shows an example create videoconference interface.

Referring to FIG. 4, a videoconference is scheduled (step 402). For example, videoconference recording server 208 can provide a create videoconference interface. An example create videoconference interface 500 is shown in FIG. 5. Videoconferences can be scheduled on interface 500 by the videoconference creator (that is, the videoconference owner) who is typically also a participant user of the videoconference. Create videoconference interface 500 allows the videoconference owner to specify the videoconference schedule (at 502), participants (at 504), and the like. Create videoconference interface 500 also includes a record checkbox 506 to indicate that the created videoconference should be recorded. Additionally, the create videoconference interface allows the videoconference creator to assign a name (at 508) and recording password (at 510) to videoconference recording 304.

At the scheduled time, referring again to FIG. 4, the videoconference begins (step 404). Videoconference recording server 208 records the videoconference (step 406). Videoconferences set to record are recorded by videoconference recording server 208 starting at the videoconference's scheduled start time (or optionally upon arrival of the first participant). Recording ends when the scheduled end time has been reached, and when all participants have left the videoconference. A videoconference owner can end a videoconference before the scheduled end time, and thereby stop unnecessary continued recording of empty content in the remaining videoconference schedule. Client applications used by the participants of the real-time videoconference may operate no differently while the videoconference is being recorded. Optionally, interface elements may be added or removed to indicate that the videoconference is being recorded.

After the videoconference has concluded and the recording process is finished, videoconference recording server 208 prepares the recording for playback (step 408). This may include indexing collected data streams and media and added data generation to better define videoconference recording 304. Once recording 304 is prepared for playback on videoconference recording server 208, a user can access recording 304 for playback.

To begin playback of a videoconference recording 304, a user provides a request to stream the recording 304 (step 410). For example, the user logs in to user interface 350 of videoconference recording server 208. The user provides the videoconference name and a playback password, which are used to authenticate the logon. Access controller 308 select one of a plurality of user types based on the request (step 412). For example, the user types can include editing, restricted, and unrestricted, as described herein. Of course, any number of user types can be defined, each associated with a different content filter 316 for videoconference recording 304. Access controller 308 can select the user type based on information submitted with the request, for example such as a login ID, password, and the like.

Access controller 308 also selects one of a plurality of content filter 316 for the videoconference recording 304 based on the selected user type (step 414). At least one of the content filters 316 identifies one or more portions of the videoconference recording 304 to be censored. For example, a content filter 316 can identify one or more portions of the video recording in videoconference recording 304 to be omitted.

Stream processor 312 streams the video recording to the user, except for the portion(s) of the video recording to be omitted (step 416). Stream processor 312 can replace the omitted portion(s) with null data. Access controller 308 can also transmit the selected content filter 316, which can be used by playback controller 324 to skip the omitted portion(s) instead of playing null data.

To edit a videoconference recording 304, an editing user, such as the videoconference owner who originally created the real-time videoconference and caused it to record, uses the videoconference name and recording password he defined when scheduling the videoconference. This editing password allows full access to playback of the recording content, including editing options. Videoconference recording server 208 identifies his login with a user type of editing user of the recorded videoconference, and provides tools to the user for assignment of additional playback access passwords to be used by other viewing participants. The editing user can define alternate passwords to authenticate users of types other than editing user. These restricted viewing or unrestricted users utilize the same playback login interface for access to the videoconference recording.

Figure 6:
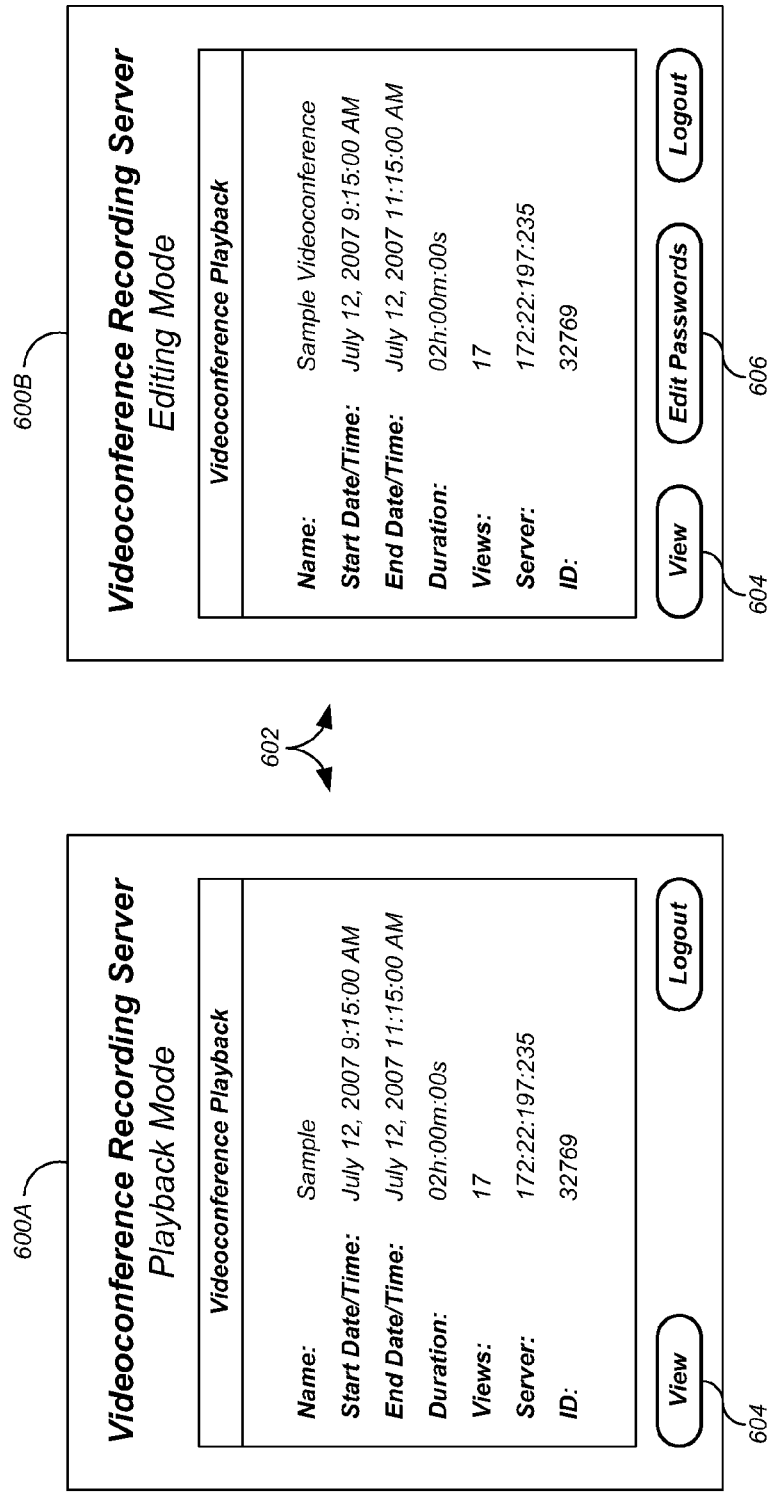
FIG. 6 shows a playback information interface for non-editing users such as restricted viewing and unrestricted users, and a playback information interface for an editing user.

Once authenticated by videoconference recording server 208, users of the playback system are presented with a playback information interface. FIG. 6 shows a playback information interface 600A for non-editing users such as restricted viewing and unrestricted users, and a playback information interface 600B for an editing user. Both interfaces 600 present the recording's details 602 and access control tools according to the user type, and can include other information such as event summary thumbnails. But playback information interface 600 differs for different types of users. Playback information interface 600A for restricted viewing and unrestricted users provides controls for videoconference recording playback only, such as view button 604. Playback information interface 600B for editing users contains additional controls such as a button 606 for editing passwords, and the like, as described below. In addition, other elements such as videoconference event summary thumbnail information may be different among the differing user types. For example, content for restricted users can be limited compared with that for unrestricted users or editing users. However, for all user types the playback information interface includes view button 604 to begin playback of videoconference recording 304.

Referring again to FIG. 4, editing users can edit videoconference recording 304 to altering the playback for other user types (step 414). Editing tools allow construction of different "views" of videoconference recording 304, each defined by a respective content filter 316. Access to a particular view is determined according to the authentication procedure. For example, a password that authenticates a user as having a restricted viewing type limits that user's access to playback of one or more censored views of the recording. Alternately, a password authenticating an unrestricted viewing user enables playback of the full original videoconference recording. An editing password authenticates the user as an editing user and provides full access to playback of the original recording, as well as playback of constructed views.

Figure 7:
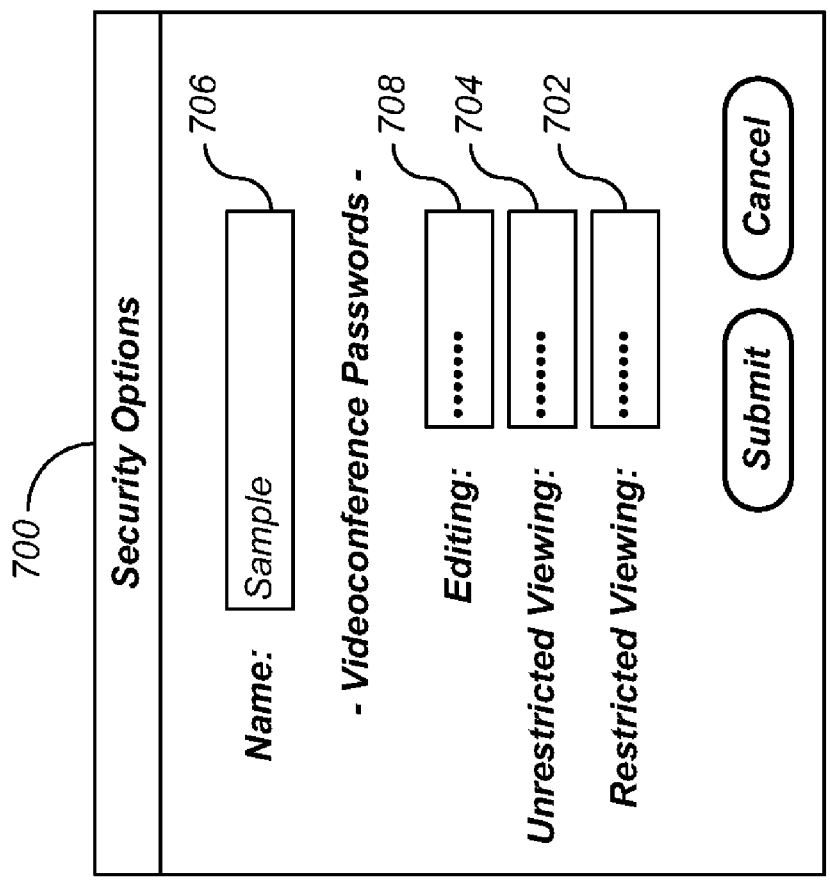
FIG. 7 shows an example content security options panel.

Editing users can access a security options panel, for example by selecting edit passwords button 606 (FIG. 6). FIG. 7 shows an example content security options panel 700. Referring to FIG. 7, security options panel 700 allows editing users to assign or edit passwords for restricted viewing (at 702) or unrestricted viewing (at 704) user types. These playback-only passwords allow users other than editing users to access videoconference recording 304.

The security options panel also provides a name field 706 to edit the name of the recorded videoconference 304 to differ from that originally assigned when the videoconference was scheduled and recorded (at 508, FIG. 5). Likewise the editing user password can also be changed (at 708). Subsequent access to videoconference recording 304 requires a match to the values from these fields.

This description discusses creation of one censored playback (also referred to as a playback view) of videoconference recording 304 to be seen by restricted users (and available to the editing user). It should be appreciated that additional passwords can be defined and associated with numerous alternate user types and playback views. For example, an automated summary view could be accessed via a summary viewing password. Alternately, an editing user may create a "director's cut" view, different from the "censored" view, and available under another unique password.

Once authenticated for playback by videoconference recording server 208, a view button 604 on playback information interface 600 is used to launch client playback application 302. Any number of users with the same name and password can access a given videoconference recording view, limited only by the capacity of videoconference recording server 208. For example, the password for restricted viewing can be given to all people in an organization to view a recorded company-wide videoconference. Each person using the videoconference name and password controls his instance of client playback application 302 and access to the recording. Using the controls contained in the client playback application interface, each user can view the recording on his own schedule.

When launched, client playback application 302 communicates with videoconference recording server 208, connects to the videoconference recording content, and begins playback. Videoconference recording server 208 generates the media streams and documents from the recording according to playback controls and time markers. Content filters 316 are also sent to client playback application 302 for the recording according to user type. Client playback application 302 uses content filter 316 for playback flow control and control of graphical indicators. Other indicators can be used to represent a variety of media activity at various videoconference times.

Figure 8:
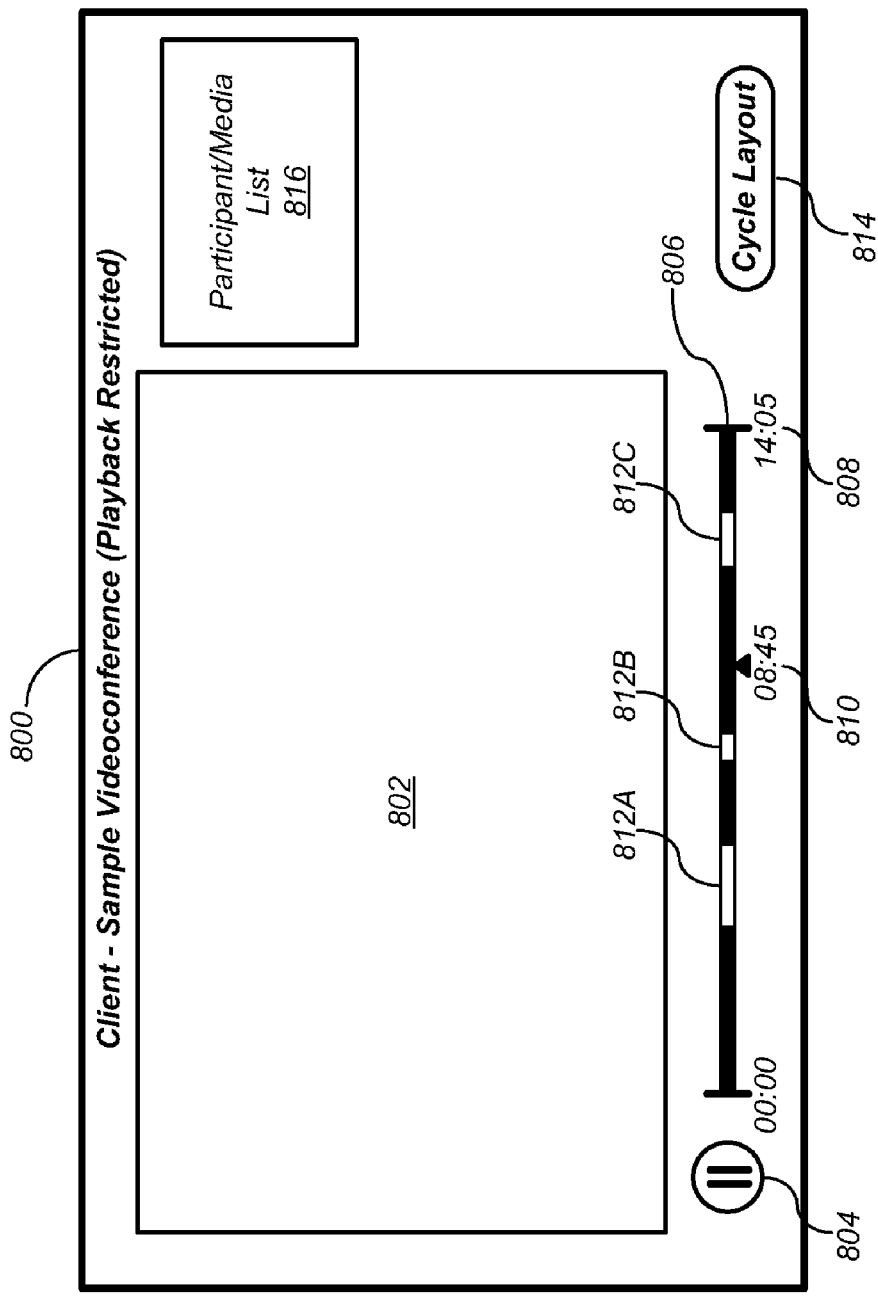
FIG. 8 shows an interface produced by the client playback application of FIG. 3 for a restricted user.

FIG. 8 shows an interface 800 produced by client playback application 302 of FIG. 3 for a restricted user. Referring to FIG. 8, interface 800 includes a video viewing area 802, a play/pause button 804, and a timeline 806. Timeline 806 shows the videoconference duration (at 808) and the current playback location (at 810). Timeline 806 is color-coded to indicate portions of the videoconference recording that have been omitted for restricted viewing (at 812A,B,C). Of course, interface 800 can include other elements, for example including thumbnail markers. Interface 800 represents a global view of recording 304. Current playback location 810 is marked by an indicator that advances across timeline 806 at the playback rate. Clicking on timeline 806 seeks forward or backward in videoconference recording 304 to the chosen videoconference time. Play/pause button 804 can also be used to control content flow. Other controls can be included to control playback audio volume, to scale timeline 806, and the like.

Figure 11:
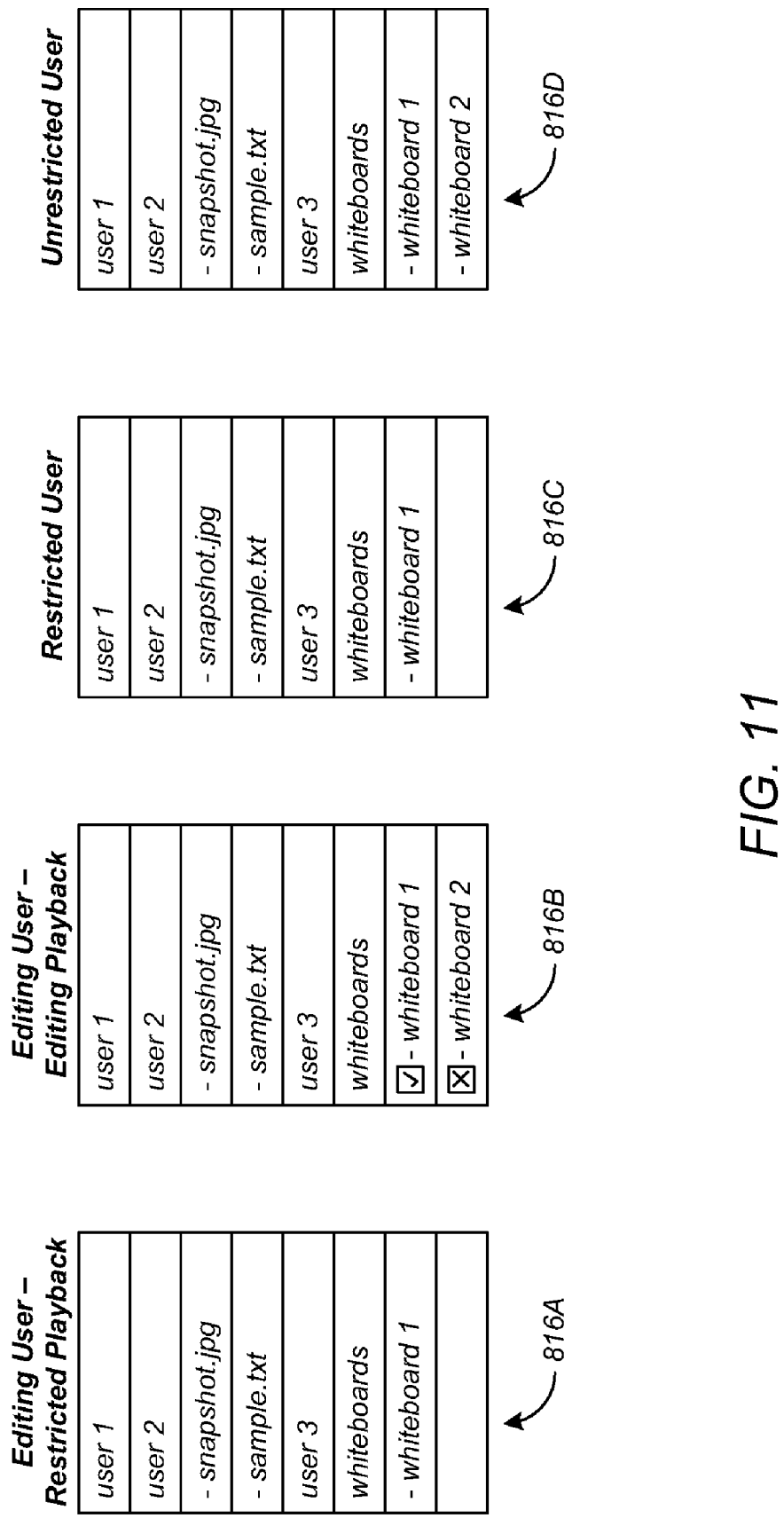
FIG. 11 shows views of an example client playback application interface listing the participants that attended the videoconference recording and the documents exchanged for different user types.

Interface 800 can also include application sharing areas and document data from videoconference recording 304, and can be configured to automatically size appropriate content to the largest panel. Automatic media panel selection is based upon usage signals and events within the recorded content (i.e. real-time manipulation of a document or annotation at the time of recording is stored and thus can change the layout to document content view during playback). Content presentation and layout can also be determined by direction of a presenter of the videoconference. A cycle layout button 814 can be included to select the layout of video viewing area 802, which can affect the layout of interface 800. Interface 800 can also include a participant/media list 816 of participants that attended the videoconference and media used during the videoconference. List 816 can be accessed to download or print the media. Examples of list 816 for different user types are shown in FIG. 11 and discussed below.

Figure 9:
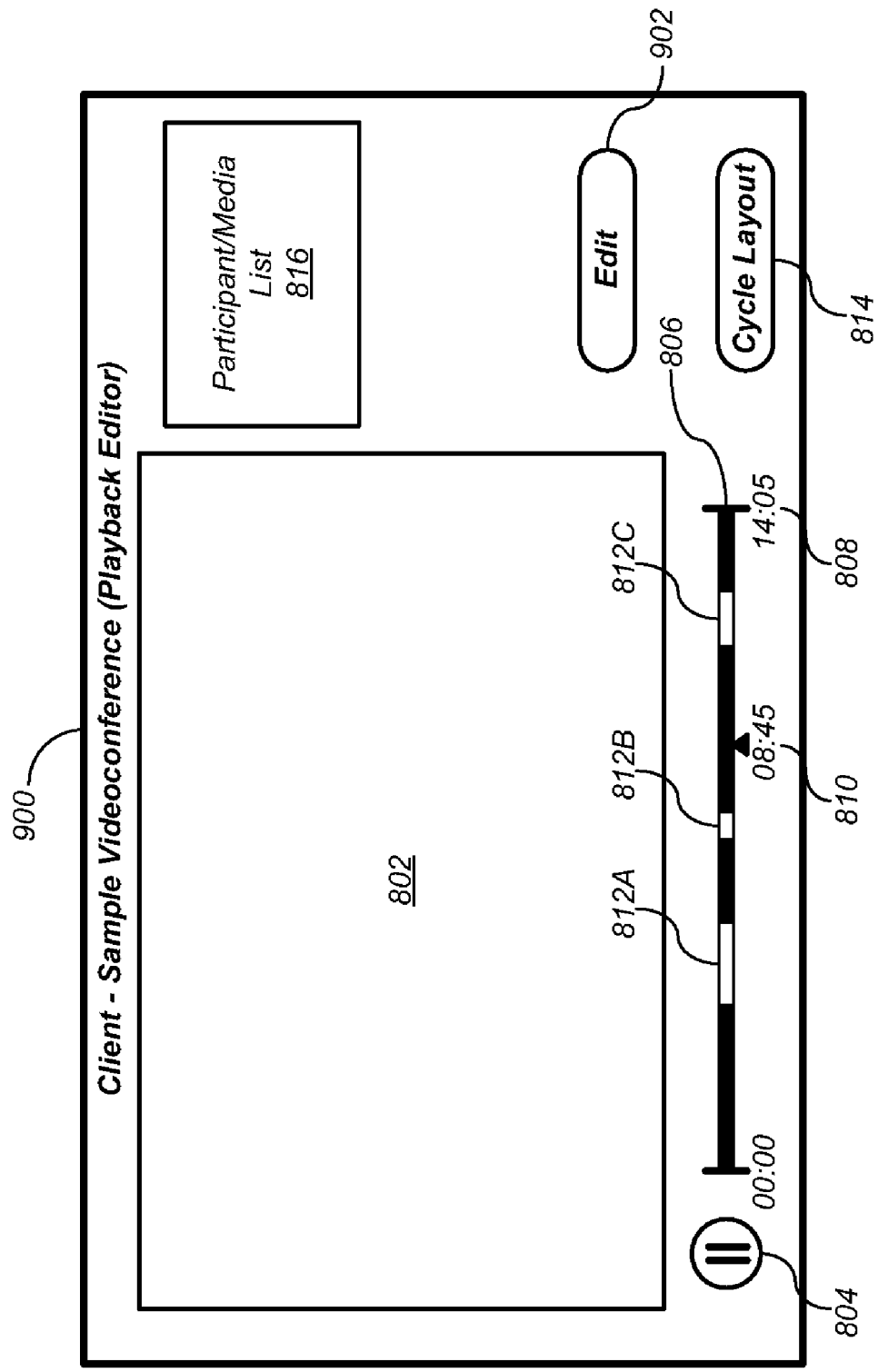
FIG. 9 shows an interface produced by the client playback application of FIG. 3 for an editing user in a restricted (normal) playback state.

When client playback application 302 is launched by an editing user, additional media controls are provided. Videoconference recording server 208 ensures that editing user access to the recording is atomic. During an editing user's access to a videoconference recording 304, any attempted or existing access to recording 304 by other user types is prohibited. FIG. 9 shows an interface 900 produced by client playback application 302 of FIG. 3 for an editing user in a restricted (normal) playback state.

Referring to FIG. 9, note that interface 900 includes an edit button 902. Edit button 902 is used to change the editing state for recording 304. In this example, client playback application 302 is initialized with a restricted playback state. Interface 900 shows portions of recording 304 that have been edited previously (at 812A,B,C). A content filter 316 representing these edits is provided to client playback application 302 when the playback session is initialized.

As noted previously, censor bars 812 represent recording content that is not available to restricted users; that is, the content is omitted from recording 304 for those users. In the restricted playback state of the editing user, the videoconference recording playback is advanced automatically to the next unmarked time position when current location indicator 810 coincides with a censor bar on timeline 806. That is, the content within that portion of videoconference recording 304 is omitted. Attempting to seek to a position within a censored region 812 results in advancing of the current location indicator 810 to the next non-censored region of timeline 806.

Figure 10:
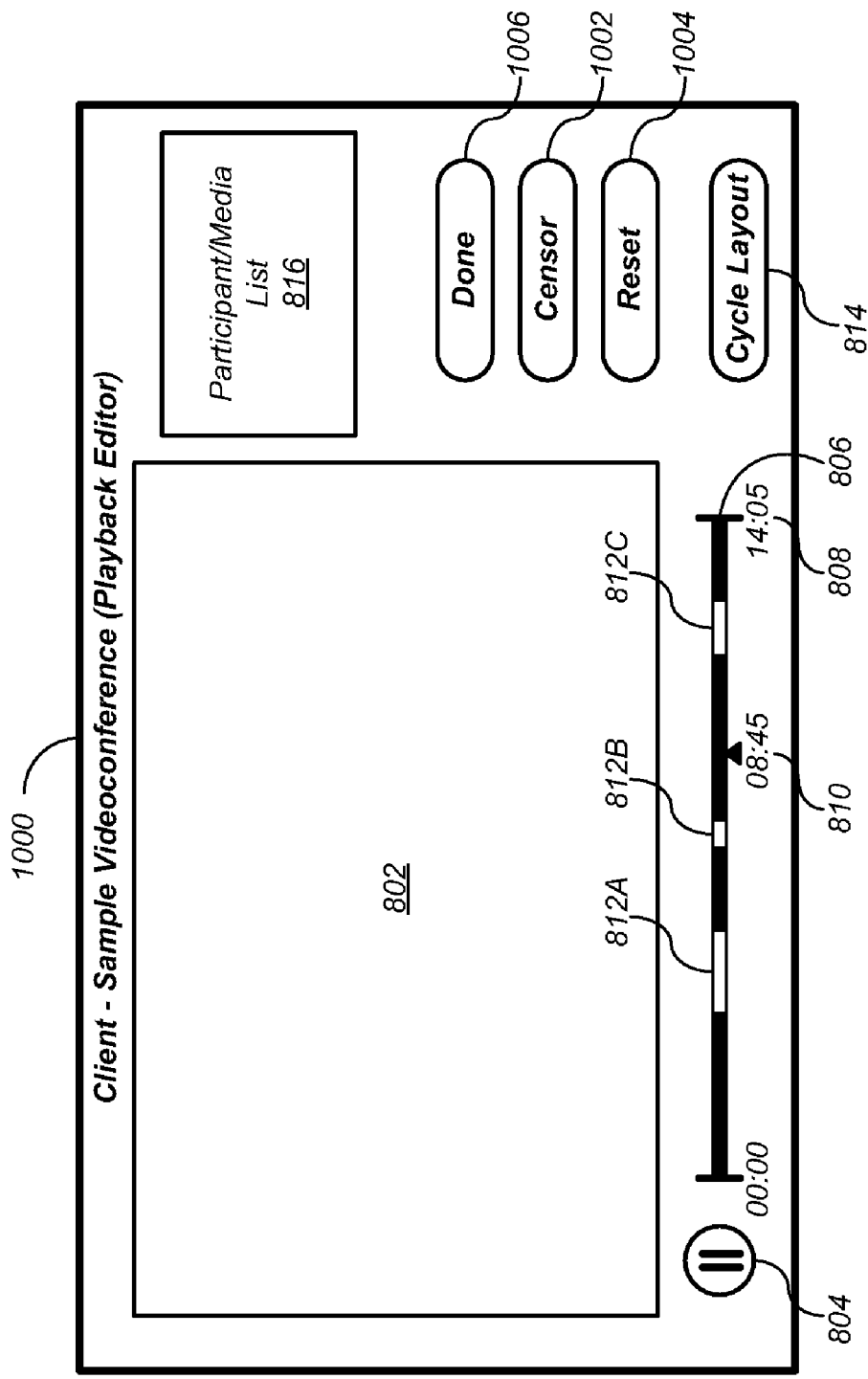
FIG. 10 shows an interface produced by the client playback application of FIG. 3 for an editing user in an editing playback state.

Pressing edit button 902 evokes a change of the playback state to editing, and restarts the playback session. FIG. 10 shows an interface 1000 produced by client playback application 302 of FIG. 3 for an editing user in an editing playback state. In this state, all recording content is playable, and all videoconference documents are visible. Censor bars 812 in timeline 806 mark censored portions of videoconference recording 304, but automatic advancing past these portions is disabled. Videoconference recording server 208 provides content across the communication interfaces even for censored portions. This is unlike the restricted playback state where content is also filtered by server 208. Although client playback application 302 automatically controls seek access past edited content in the restricted playback state, this seeking is primarily for user benefit as the streaming media received during these portions of the videoconference is omitted and replaced with null data such as silent audio, blank video, and the like. In the editing playback state, videoconference recording server 208 does no filtering on the recording content.

For the purpose of editing, timeline 806 provides a place for marking time ranges in recording 304. Marking may result from a mouse drag over timeline 806, for example. Marking may also occur during the natural viewing of the recording playback. While playback is occurring, for example, the user might hit a button or a key to specify a starting time marker followed by another key or button click when playback of the recording has reached a desired ending time. In any case, the result is a range of time representing some portion of videoconference recording 304.

Once a range is identified, editing functions can operate. Referring to FIG. 10, interface 1000 includes a censor button 1002 and a reset button 1004. Censor button 1002 is used to mark the selected range for censoring such that playback of recording content within that range will not be viewable or audible to restricted users. Reset button 1004 is used to remove any previously marked area within the selected range, thereby removing the content restriction. Interface 1000 also includes a done button 1006 to indicate that editing is complete.

Of course, other editing operations are contemplated. Additionally, operations on selected ranges can be limited to a subset of the recording's media channels, for example to mute the audio only. In addition, videoconference documents can be censored using the censor operation.

FIG. 11 shows participant/media list 816 (FIG. 8) of an example client playback application interface listing the participants that attended the videoconference recording and the documents exchanged for different user types. While the editing user is in the editing playback state, the participant and document lists show the set of all documents and whiteboards saved to the videoconference recording 304. Note that each view 816 of the interface changes according to the user type and playback state of recording 304.

The view 816D for unrestricted users shows all videoconference participants and documents in the recording as they appeared during the original videoconference. Unrestricted users are always in a full playback state. Restricted users, however, see only those recorded elements allowed by the editing user, as shown in view 816C. Restricted users are always in a restricted playback state.

An editing user who is actively editing the recorded content during playback (editing playback state) has an interface view that shows all participants and documents, as shown in view 816B. An editing user who is not actively editing the recorded content (restricted playback state) does not see all documents, similar to the restricted users, as shown in view 816A.

In the editing user's editing playback state, view 816B includes edit controls for enabling or restricting each document element. The user can use the checkbox next to each document to censor the document from recording playback for the restricted user. Documents can be marked with an 'X' to be censored, or marked with a 'check' to be made available to all playback users.

When the editing user presses done button 1006 in interface 1000 (FIG. 10), client playback application 302 transitions from the editing playback state to the restricted playback state. If the content filter has been updated during the edit playback session, the editing user can instruct client playback application 302 to commit all the editing changes to videoconference recording server 208 before the playback state changes. The recording playback session is then restarted with the playback state changes.

Figure 12:
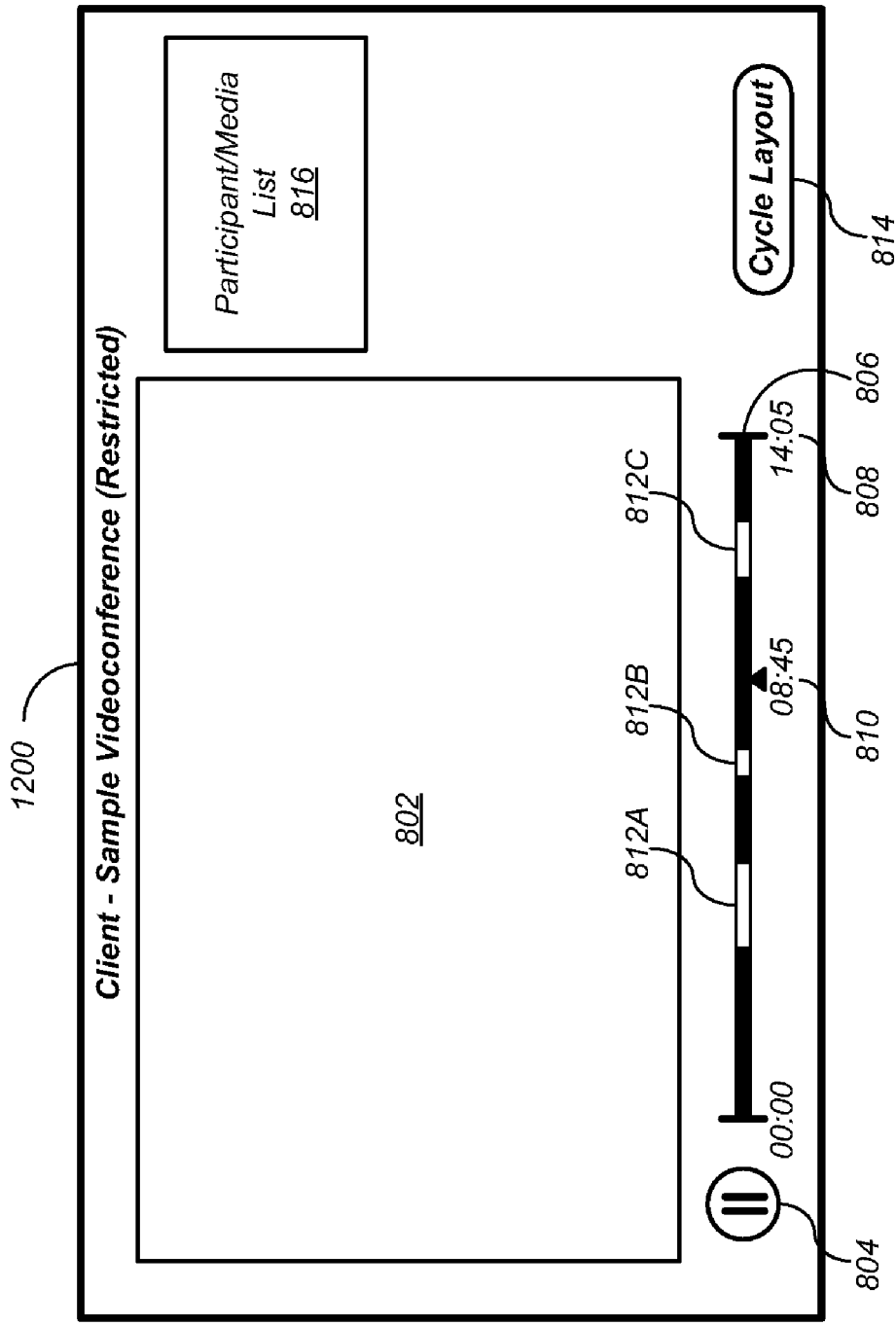
FIG. 12 shows an interface produced by the client playback application of FIG. 3 for restricted users.

FIG. 12 shows an interface 1200 produced by client playback application 302 of FIG. 3 for restricted users. Censor bars 812 on timeline 806 mark censored intervals of videoconference recording 304. Client playback application 302 does not allow restricted users to play these censored portions. Interface 1200 does not contain editing buttons or controls. Like the censored portions of recording 304, documents not intended for viewing are neither shown nor transferred to client playback application 302 by server 208.

In some embodiments, the editing user might censor only some of the content channels, for example only the audio stream. Alternate indicators can be utilized to indicate this type of censoring. For example, censor bars 812 can be replaced by colored bars according to which media channels were censored. Alternate displays can be provided to show edited recording areas affected on a per-channel basis. In some embodiments, the censored regions can be visually removed, and timeline 806 collapsed, such that the videoconference playback duration appears shorter.

Figure 13:
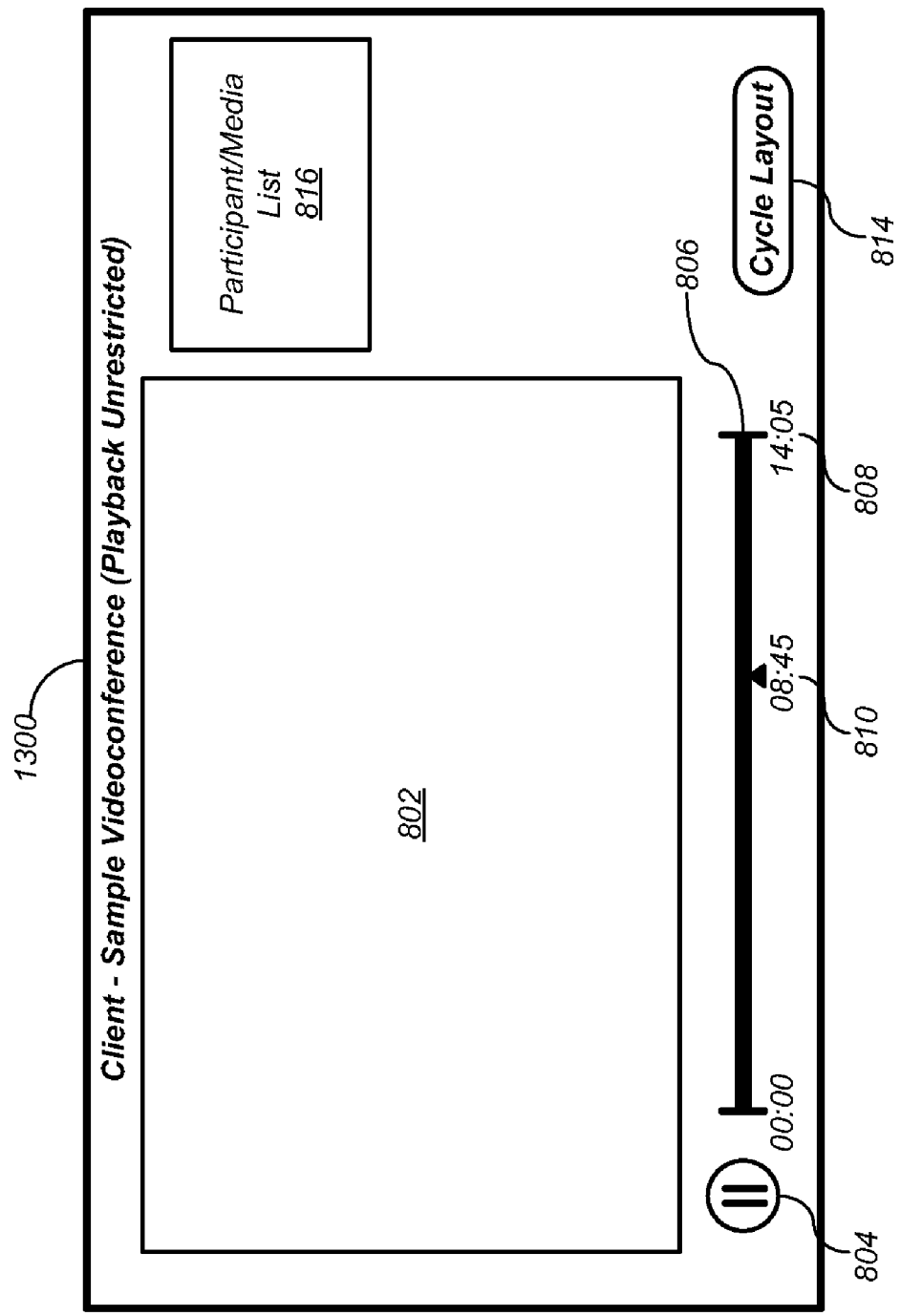
FIG. 13 shows an interface produced by the client playback application of FIG. 3 for unrestricted users.

FIG. 13 shows an interface 1300 produced by client playback application 302 of FIG. 3 for unrestricted users. The entire videoconference recording 304 is available to unrestricted users. All thumbnail markers and timeline activity is presented. Although the playback state is unrestricted, since the user is not an editing user, interface 1300 omits the editing controls reserved for editing users. Range marking and other edit functions are not provided.

The following section describes some example communication that can occur between videoconference recording server 208 and client playback application 302 to facilitate editing. Table 1 contains a list of commands that can be exchanged during editing.

Along with videoconference authorization and connection related communication commands, playback sessions begin with the transmission of a CmdPlaybackInfo command from server 208 to client playback application 302. This command contains recording-specific information for the playback interfaces. The duration argument, for example, is used to initialize timeline interfaces and set up restrictions for seek access into recording 304.

The userType argument notification is matched to the access rights for the editing method and interfaces. If the userType specified indicates an editing user of the recording content, the client interface is enabled to provide appropriate elements to allow a change of playback state for the editing functions (see CmdPlaybackState). Other values for userType may also affect the interface elements of the client accordingly. Restricted users may have reduced interfaces and content limitations, for example.

An editing session that includes censored recordings continues with transmission of a CmdPlaybackMaskRange command from server 208 to the client. Contained within this command are lists of time pairs, per content channel, marking intervals of recording 304 that should not be transmitted and played by restricted users. Each time pair (start time—end time) may be expressed in videoconference time units (i.e. seconds) relative to the beginning of the videoconference to denote a range from 0 to the videoconference duration (as specified in the CmdPlaybackInfo command). Each list of pairs defines the time ranges over a specific media stream (i.e. audio, video, data sharing, etc.) that are affected. Client playback application 302 uses these lists to present user interface elements and control restrictions according to the user's type and system operational modes.

When joining a real-time videoconference, server 208 transmits lists of participant and document IDs for the videoconference to the connecting client. Similarly, during recorded videoconference playback, these lists are provided at the start of the session so that documents may be downloaded for quick display when referenced by recording 304 during the playback. The CmdPlaybackMaskRange command includes a medialds list to notify client playback application 302 of the documents that shall not be shown to restricted users. If the user of client playback application 302 is of a restricted type, these documents will not be downloaded and displayed in the document list interfaces.

For an unrestricted user type, the CmdPlaybackMaskRange elements are ignored. Playback proceeds without restrictions from the server 208 or the client. For the editing user type, the playback interface is initialized in a normal playback state. In this state, playback follows a restricted user view of the recording (i.e. according to the CmdPlaybackMaskRange element restrictions). Interface controls, however, allow for the editing user to change playback mode to full with an unrestricted view of the videoconference content. This allows the editing user access to the entire media stream for markup. By changing playback modes, the editing user can visualize his editing result as seen by the restricted user.

The CmdPlaybackState is sent by the client to server 208 to affect a change in playback state. This command is only accepted from an editing user (typically the videoconference owner). Acknowledgement of this command by server 208 results in re-initialization of the videoconference playback from the beginning as if newly connected to the playback session. Playback state is set to full for editing of the recording and reset to restricted after editing is completed.

During editing, the user interface provides options to restrict stream playback or document access. This editing function directly affects the client's local storage of the CmdPlaybackMaskRange data received at the start of the playback session or received at the start of re-initialization after a CmdPlaybackState change. When editing is done, and before the CmdPlaybackState change command is sent, the user can choose to commit his edits. If edits are discarded, the playback state is changed and the incoming CmdPlaybackMaskRange command that results resets the local client storage to match the state of server 208. If edits are committed, the editing client sends a revised CmdPlaybackMaskRange command to server 208 with appropriate arguments and awaits processing by server 208. Server 208 performs necessary operations to affect the change and replies with a CmdPlaybackMaskRangeDone to the client when completed. Upon receipt of this acknowledgement, the client continues with sending the CmdPlaybackState change event to leave the editing playback mode.

TABLE 1

| Name | Fields | Distribution | Description | Server-Side Action |
|---|---|---|---|---|
| CmdPlaybackInfo | int duration—Recording duration, in seconds. int MCUStartup—Time offset that the audio/video playback should begin relative to the document | Server to client only. | This command is sent from the playback server to a client immediately after CmdJoinMeetingAckV2 is sent. It includes the essential information to initialize the playback | Audio/video channels are not connected until some variable time after the initial document channel connection. As such, their recording start time is different from the document channel |

TABLE 1-continued

| Name | Fields | Distribution | Description | Server-Side Action |
|---|---|---|---|---|
| | channel meeting start (in seconds). long meetingStartTime— Time the meeting recording started in milliseconds since Jan. 1, 1970 int userType 0—Normal. Cannot edit or view cut sections. 1—Unrestricted. Can view cut sections but cannot edit. 2—Owner. Allowed to edit meeting. | | interface. | meeting start time. The MCUStartup value helps to synchronize these streams. |
| CmdPlaybackThumbnail | int index—Thumbnail time position within the meeting (seconds since meeting start). int format—Format of the data being sent (1-JPEG, 2-BMP, 3-PNG, 4-YUV). If format is 0, then the thumbnail data is empty and any thumbnail for the specified time should be removed. int width—Width of the thumbnail (unused?). int height—Height of the thumbnail (unused?). int array attributes— This array could be used for future expansion. a(0) = type of thumbnail 1—video 2—app sharing 3—doc cam sharing 4—whiteboard 5—document bin data—Thumbnail binary data. | Server to client only | This command allows the playback client to provide a preview of the meeting state for a particular time. | |
| CmdPlaybackPause | int paused— Requesting pause status: *0 = Resume *1 = Pause | Client to server. | This command is sent by a playback client to stop and restart recording playback. | All unnecessary data transmission is halted while paused (i.e. document channel pings may continue and empty payload packets on audio/video sockets are valid to keep channels alive. |
| CmdPlaybackSeek | int time—Time offset in seconds from recording start that client would like playback to move to. | Client to server only. | This command is sent by a playback client to jump to an arbitrary point in the meeting recording. | All unnecessary data transmission is halted. |
| CmdPlaybackResync | int time—Time offset in seconds from recording start that server is sending state for. int type—Type of sync command. *0 = Begin *1 = End | Server to client only | This command is sent by a server in response to a CmdPlaybackSeek to bracket a set of commands that are meant to update the client to the correct state for a particular recording offset, as opposed to commands being played back at their original spacing. Commands in client queues prior to a begin event will be flushed. An end event | |

TABLE 1-continued

| Name | Fields | Distribution | Description | Server-Side Action |
| --- | --- | --- | --- | --- |
| CmdPlaybackResyncAck | | Client to server only. | will allow the client to start queuing data again. This command is sent by a playback client to acknowledge that the state synchronization commands have been processed, and that the client is ready for continued data transmission. | Server starts sending document channel, audio, and video stream data again. |
| CmdPlaybackTimeMarker | long milliseconds—Time since the start of the meeting. | Server to client only. | This command may be sent by the server before most document channel commands to identify to the client when playback should occur for the next following document channel command. | Send before each recorded commands. |
| CmdPlaybackInitialized | int status—status of the initialization. | Server to client only. | This command will be sent by the server after all document channel events have been given to the client on initial connection. The server is notifying the client that it is ready to accept playback events. The client will connect H.323 connections and prepare for playback. When the client is ready, it will send a CmdPlaybackResync request for the meeting time specified (i.e. 0 for start of meeting.) | |
| CmdPlaybackEventRange | int type—Event type<br>*1 = Meeting active (1 or more participants connected)<br>*2 = Application sharing<br>*3 = Document camera sharing<br>*4 = Presenter active<br>int start—Event start time in seconds<br>int end—Event end time in seconds<br>int userid—Userid associated with event (0 if no user associated with event) | Server to client only. | This command may be sent by the server multiple times to the client before playback starts. The client will use the event range information to enhance the playback timeline. | |
| CmdPlaybackMaskRange | int array audioStartEndPairs<br>int array videoStartEndPairs<br>int array sharingStartEndPairs<br>(all values in seconds)<br>int array mediaIds—Specifies the set of media masked by the server during normal playback. | Server to client.<br>Client (meeting owner only) to server. | Each array of time pairs specifies a set of ranges within each channel that should be masked from the meeting (i.e. user does not hear/see the media content). Only meeting owner can send this command (Client to Server). | The server sends this information before playback starts. An edit capable client may send this information to the server in response to some range selection GUI. |
| CmdPlaybackMaskRangeDone | int status 0—success | Server to client only. | The server sends this command to the client after receiving and processing the data in the CmdPlaybackMaskRange command. | Playback is halted. Server updates mask ranges and generates any needed data key frames. |
| CmdPlaybackState | int state—Changes the playback state.<br>*0 = Normal/Masked Playback (default) | Client (meeting owner only) to server. | This setting changes the playback operation mode. Only meeting owner can send this command | The server will reply with a CmdPlaybackInitialized message, resulting in the client |

TABLE 1-continued

| Name | Fields | Distribution | Description | Server-Side Action |
| --- | --- | --- | --- | --- |
| | *1 = Full Playback (Mask Ignored) | | (Client to Server). | CmdPlaybackResync request restarting the meeting from the beginning. |

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. Accordingly, other implementations are within the scope of the following claims.

What is claimed is:

1. A non-transitory computer-readable media embodying instructions executable by a computer to perform a method comprising:
    receiving a request to stream a video recording;
    selecting one of a plurality of user types based on the request, wherein said plurality of user types includes an unrestricted viewing type and at least one restricted viewing type;
    selecting one of a plurality of predefined content filters associated with said video recording based on the selected user type, wherein the content filters associated with a restricted viewing type identify one or more portions of the video recording to be omitted, and the content filter associated with the unrestricted viewing type do not omit any portion of the video recording; and
    streaming the video recording, wherein the streaming video recording is displayed except for any portions of the video recording to be omitted as determined by the selected predefined content filter.

2. The non-transitory computer-readable media of claim 1, wherein:
    the video recording comprises a recording of a finished videoconference; and
    restricted viewing types cannot alter their associated content filter.

3. The non-transitory computer-readable media of claim 2, wherein:
    said user types further include an editing type having access to create said content filters and associating the created content filters with other user types, including said restricted viewing types;
    the request includes a password; and
    selecting the one of the plurality of user types based on the request comprises selecting the one of the plurality of user types based on the password.

4. The non-transitory computer-readable media of claim 3, wherein said editing type further has access for creating new restricted viewing types and associating them with created content filters.

5. The non-transitory computer-readable media of claim 1, wherein restricted viewing types lack permission to view any portion of the video recording omitted by their associated content filter, said method further comprising:
    transmitting the selected content filter;
    wherein a playback application uses the selected content filter to skip the one or more portions of the video recording to be omitted.

6. An apparatus comprising:
    a user interface module adapted to receive a request to stream a video recording;
    an access controller adapted to select one of a plurality of user types based on the request, wherein said plurality of user types includes an unrestricted viewing type and at least one restricted viewing type, and adapted to select one of a plurality of predefined content filters associated with said video recording based on the selected user type, wherein the content filters associated with a restricted viewing type identify one or more portions of the video recording to be omitted, and the content filter associated with the unrestricted viewing type do not omit any portion of the video recording; and
    a stream processor adapted to stream the video recording, wherein the streaming video recording is displayed except for any portions of the video recording to be omitted as determined by the selected predefined content filter.

7. The apparatus of claim 6, wherein:
    the video recording comprises a recording of a finished videoconference; and
    restricted viewing type cannot alter their associated content filter.

8. The apparatus of claim 7, wherein:
    said user types further include an editing type having access to create said content filters and associating the created content filters with other user types, including said restricted viewing types;

the request includes a password; and the access controller selects the one of the plurality of user types based on the password.

9. The apparatus of claim 8:

said editing type further has access for creating new restricted viewing types and associating them with created content filters.

10. The apparatus of claim 6:

wherein restricted viewing types lack permission to view any portion of the video recording omitted by their associated content filter;

wherein the access controller transmits the selected content filter; and wherein a playback application uses the selected content filter to skip the one or more portions of the video recording to be omitted.

11. An apparatus comprising:

user interface means for receiving a request to stream a video recording;

access control means for selecting one of a plurality of user types based on the request, wherein said plurality of user types includes an unrestricted viewing type and at least one restricted viewing type; and for selecting one of a plurality of predefined content filters associated with said video recording based on the selected user type, wherein the content filters associated with a restricted viewing type identify one or more portions of the video recording to be omitted, and the content filter associated with the unrestricted viewing type do not omit any portion of the video recording; and stream processor means for streaming the video recording, wherein the streaming video recording is displayed except for any portions of the video recording to be omitted as determined by the selected predefined content filter.

12. The apparatus of claim 11, wherein:

the video recording comprises a recording of a finished videoconference; and said restricted viewing type cannot alter their associated content filter.

13. The apparatus of claim 12:

wherein:

said user types further include an editing type having access to create said content filters and associating the created content filters with other user types;

the request includes a password; and the access control means selects the one of the plurality of user types based on the password.

14. The apparatus of claim 13:

wherein said editing type further has access for creating new restricted viewing types and associating them with created content filters.

15. The apparatus of claim 11:

wherein restricted viewing types lack permission to view any portion of the video recording omitted by their associated content filter;

wherein the access control means transmits the selected content filter; and wherein a playback application uses the selected content filter to skip the one or more portions of the video recording to be omitted.

16. The non-transitory computer-readable media of claim 2, wherein a restricted viewing type is presented with information indicating which portions of the video recording are omitted by its associated content filter.

17. The non-transitory computer-readable media of claim 16, wherein:

said editing type may further access a content filter associated with a restricted viewing type and receive information indicating which portions of the video recording are omitted by the accessed content filter; and a playback application of a said editing type optionally ignores the accessed content filter and plays the portions of the video recording that the content filter indicates should be omitted.

18. The non-transitory computer-readable media of claim 17, wherein said editing type may amend the accessed content filter.

19. The apparatus of claim 8, wherein:

a restricted viewing type is presented with information indicating which portions of the video recording are omitted by its associated content filter;

said editing type may further access a content filter associated with a restricted viewing type and receive information indicating which portions of the video recording are omitted by the accessed content filter; and a playback application of a said editing type optionally ignores the accessed content filter and plays the portions of the video recording that the content filter indicates should be omitted.

20. The apparatus of claim 13, wherein:

a restricted viewing type is presented with information indicating which portions of the video recording are omitted by its associated content filter;

said editing type may further access a content filter associated with a restricted viewing type and receive information indicating which portions of the video recording are omitted by the accessed content filter; and a playback application of a said editing type optionally ignores the accessed content filter and plays the portions of the video recording that the content filter indicates should be omitted.

* * * * *